(12) United States Patent
Zhou et al.

(10) Patent No.: US 9,036,510 B1
(45) Date of Patent: May 19, 2015

(54) METHOD AND SYSTEM FOR SETTING UP A CONFERENCE WITH A MOBILE STATION VIA ANOTHER MOBILE STATION

(75) Inventors: Tong Zhou, Overland Park, KS (US); David Mohan, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2803 days.

(21) Appl. No.: 11/455,602

(22) Filed: Jun. 19, 2006

Related U.S. Application Data

(63) Continuation-in-part of application No. 11/393,058, filed on Mar. 30, 2006, now Pat. No. 7,720,021.

(51) Int. Cl.
H04L 12/16 (2006.01)
H04L 29/06 (2006.01)
H04M 3/42 (2006.01)

(52) U.S. Cl.
CPC ............................... *H04L 29/06319* (2013.01)

(58) Field of Classification Search
USPC .................................................. 370/260–262
See application file for complete search history.

(56) References Cited

U.S. PATENT DOCUMENTS

| | | | |
|---|---|---|---|
| 5,737,703 A | 4/1998 | Byrne | |
| 5,774,461 A | 6/1998 | Hyden et al. | |
| 5,898,679 A | 4/1999 | Brederveld et al. | |
| 5,907,540 A | 5/1999 | Hayashi | |
| 6,115,762 A | 9/2000 | Bell et al. | |
| 6,205,495 B1 | 3/2001 | Gilbert et al. | |
| 6,292,747 B1 | 9/2001 | Amro et al. | |
| 6,327,254 B1 | 12/2001 | Chuah | |
| 6,330,244 B1 | 12/2001 | Swartz et al. | |
| 6,438,117 B1 | 8/2002 | Grilli et al. | |
| 6,680,923 B1 | 1/2004 | Leon | |
| 7,193,987 B2 | 3/2007 | Vilander | |
| 7,408,948 B2 | 8/2008 | Lopponen et al. | |
| 2001/0036830 A1 | 11/2001 | Wu et al. | |
| 2003/0091021 A1 | 5/2003 | Trossen et al. | |
| 2004/0236850 A1 | 11/2004 | Krumm et al. | |
| 2004/0264410 A1* | 12/2004 | Sagi et al. | 370/331 |
| 2005/0085257 A1 | 4/2005 | Laird et al. | |
| 2006/0056440 A1* | 3/2006 | Khartabil | 370/447 |
| 2007/0091830 A1* | 4/2007 | Coulas et al. | 370/260 |
| 2007/0111743 A1* | 5/2007 | Leigh et al. | 455/518 |

OTHER PUBLICATIONS

Office Action from U.S. Appl. No. 11/393,058, dated Jan. 21, 2009.
Internet Engineering Task Force ("IETF") Request for Comments ("RFCs") 768, "User Datagram Protocol," J. Postel, Aug. 1980.

(Continued)

*Primary Examiner* — Huy C Ho

(57) ABSTRACT

A method for a setting up a conference call with a mobile station and an intermediary mobile station, using the intermediary mobile station as a bridged-node. When a conference server receives a request to setup a conference call, the conference server initiates conference setup signaling with both mobile stations using a cellular link. The conference server uses the conference setup signaling to direct one mobile station to act as a bridged-node and the other mobile station to act as a bridged-leg. Responsive to the directives, the bridged-leg mobile station and the bridged-node mobile station establish a Wi-Fi link. The bridged-leg mobile station then uses the Wi-Fi link to bridge to an air traffic channel associated with the bridged-node mobile station.

20 Claims, 4 Drawing Sheets

(56) References Cited

OTHER PUBLICATIONS

Internet Engineering Task Force ("IETF") Request for Comments ("RFCs") 791, "Internet Protocol DARPA Internet Program Protocol Specification," Information Sciences Institute, Sep. 1981.

Internet Engineering Task Force ("IETF") Request for Comments ("RFCs") 793, "Transmission Control Protocol DARPA Internet Program Protocol Specification," Information Sciences Institute, Sep. 1981.

Internet Engineering Task Force ("IETF") Request for Comments ("RFCs") 2002, "IP Mobility Support," C. Perkins, Oct. 1996.

Internet Engineering Task Force ("IETF") Request for Comments ("RFCs") 2003, "IP Encapsulation within IP," C. Perkins, Oct. 1996.

Internet Engineering Task Force ("IETF") Request for Comments ("RFCs") 2004, "Minimal Encapsulation within IP," C. Perkins, Oct. 1996.

Internet Engineering Task Force ("IETF") Request for Comments ("RFCs") 2005; "Applicability Statement for IP Mobility Support," J. Solomom, Oct. 1996.

"802.11b and 3G Synergies for 2002," 802.11 Insights, http://www.80211-planet.com/columns/article/0,4000,1781_950811,00.html, printed Feb. 22, 2002.

"E-200 Cassiopeia Pocket PC 2002," Casio, http://www.casio.com/personalpcs/product.cfm?section=19&product=4146, printed Feb. 22, 2002.

"Making Notebooks Truly Mobile," T Techtv, http://www.techtv.com/freshgear/products/story/0,23008,3347281,00.html., printed Feb. 25, 2002.

"Product Description," WeRoam, http://www.weroam.com/, printed Feb. 25, 2002.

"Roaming Between WLAN and GSM Networks to Become Easier," thinkmobile, http://www.thinkmobile.com/laptops/news/00/48/33/, printed Feb. 25, 2002.

U.S. Appl. No. 10/200,263, filed Jul. 22, 2002 entitled "Wireless Bridge for Interfacing an 802.11 Network With a Cellular Network.".

U.S. Appl. No. 11/393,058, filed Mar. 30, 2006 entitled "Method and System for Setting Up a Call to a Mobile Station Via Another Mobile Station.".

Office Action from U.S. Appl. No. 11/393,058, dated Jul. 22, 2009.

\* cited by examiner

METHOD AND SYSTEM FOR SETTING UP A CONFERENCE WITH A MOBILE STATION VIA ANOTHER MOBILE STATION

REFERENCE TO RELATED APPLICATION

This application is a continuation-in-part of U.S. patent application Ser. No. 11/393,058, filed Mar. 30, 2006, the entirety of which is hereby incorporated by reference.

FIELD OF THE INVENTION

The present invention relates to wireless communications and, more particularly, to establishing packet based real-time media conferences.

BACKGROUND

A cellular network may include a push-to-talk (PTT) server for enabling multiple mobile stations to participate in a group conference call. In some examples, the group conference call may be generally referred to as a PTT over cellular (PoC) call. Typically, a PoC based system is half-duplex in nature, similar to 2-way radio communications where one mobile station user talks at a time and the other mobile station users listen. The PTT server enables a PoC call by handling conference setup signaling and, in some examples, media stream replication and distribution. In a packet data network, such as the Internet, the conference setup signaling may be carried out, for example, with session initiation protocol (SIP) signaling and the replicated media streams may be real time transport protocol (RTP) based.

When an originating mobile station attempts a PoC call with multiple target mobile stations, the originating mobile station may send an originating SIP INVITE message to the PTT server. The originating SIP INVITE, for example, contains identifying information associated with the target mobile stations, such as phone numbers, email addresses, or a group number. The originating SIP INVITE message also includes media stream parameters (i.e., media type and format, transport protocol, transport port number, etc.). The identifying information and the media stream parameters may be located within the body of the originating SIP INVITE message according to a protocol commonly referred to as the session description protocol (SDP).

When the PTT server receives the originating SIP INVITE message, the PTT server uses the information within the originating SIP INVITE message to create a SIP INVITE message destined to each of the identified target mobile stations. Each SIP INVITE message includes the destination address of a target mobile station and the media stream parameters that were located in the originating SIP INVITE message. The PTT server forwards these generated SIP INVITE messages to one or more radio access networks (RANs) that serves the target mobile stations. In particular, the PTT server may forward the SIP INVITE messages by way of packet data serving node (PDSN) associated with a given RAN and thus initiate a packet data session between the originating mobile station and the target mobile stations.

When a RAN serving a target mobile station receives the SIP INVITE message sent from the PTT server, the RAN will verify that a target mobile station is not dormant (i.e., the target mobile station is assigned a traffic channel). If the target mobile station has an assigned air interface traffic channel, the RAN will forward the SIP INVITE message over the traffic channel to the target mobile station. If, however, the target mobile station is dormant, the RAN will first page the target mobile station and assign a traffic channel to the target mobile station. After the traffic channel is assigned, the RAN will transmit the SIP INVITE message to the target mobile station.

Responsive to receiving a SIP INVITE message, the target mobile station generates a SIP OK message, acknowledging desired media stream parameters. The SIP OK message is sent over an assigned traffic channel back to the PTT server. The PTT server, in response, may send a SIP ACK message to each of the target mobile stations, and media streaming to the target mobile stations may begin.

SUMMARY

It may happen that no traffic channels are available at the time that a PoC call is being set up. Alternatively a cellular service provider may want to limit the number of traffic channels made available for PoC calls.

Accordingly, the present invention is directed to a method and system for more efficient use of traffic channels for PoC calls. More particularly, the invention is directed to setting up packet-based real time media conferences through an intermediary mobile station.

As one example, a method of setting up a conference call is described. The conference call may be set up between two or more mobile stations that are served by the same RAN. Using air interface traffic channels assigned by the RAN, a conference server (e.g., a PTT server) may exchange conference setup signaling with each of the mobile stations. After the conference setup signaling is completed, the mobile stations may exchange media streams with each participant in the conference call. To conserve available traffic channels within the RAN, the conference server uses the conference setup signaling to coordinate the consolidation of media streams. In particular, the conference server uses the conference setup signaling to consolidate media streams associated two or more mobile stations to a single traffic channel.

Thus, an example method includes the conference server receiving a request to set up a conference with a first mobile station and a second mobile station; the conference server setting up a first conference leg with the first mobile station; and the conference server setting up a second conference leg with the second mobile station by passing a portion of the conference setup signaling through the first mobile station.

The first conference leg may include a wireless link between the RAN and the first mobile station. The wireless link between the first mobile station and the RAN includes a traffic channel assigned by the RAN and may comprise a cellular link, such as a CDMA packet-data link. The second conference leg, on the other hand, is wirelessly linked to the RAN via a communication path that includes in addition to the traffic channel, a second wireless link between the first and the second mobile stations. The wireless link between the first and the second mobile stations may be a wireless local area network (WLAN) link, such as an 802.11 link, for example. Furthermore, the first and second mobile stations may be multi-mode devices that are configured to communicate according to multiple-protocols.

To set up the second conference leg, the conference server initially directs the first mobile station to act as a bridge and initially directs the second mobile station to use the first mobile station as a bridge. To this end, the conference server may include directives within the conference setup signaling. After the first and second mobile stations receive and respond to the directives, the second mobile station may share the traffic channel with the first mobile station by using the first mobile station as bridge.

To direct the first and the second mobile stations, the conference server may transmit conference setup messages that include bridged-node and bridged-leg indicators. The bridged-leg indicator may direct the second mobile station to use the first mobile station as a bridge-node mobile station. The bridged-node indicator, on the other hand, may direct the first mobile station to act as the bridged-node. As an example, the conference server may use SIP messages for the conference setup signaling. The conference server may include the bridged-leg and bridged-node indicators within a header field or the body of SIP INVITE messages.

When the first mobile station is directed to act as a bridged-node, the first mobile station may broadcast a service set identifier (SSID) that is to be received by the second mobile station, and/or any other participants of the conference call. The SSID, for example, may include a call-ID that is associated with the conference call. In response to being directed to use the first mobile station as a bridge, the second mobile station may scan for the SSID. Once the SSID is detected, the second mobile station may send an association request to the first mobile station. Accordingly, the first mobile station may receive the association request, associate with the second mobile station, and set up a wireless link between the first and the second mobile station. After the wireless link is set up, the second mobile station may send a conference setup message, such as a SIP OK, to the conference server through the first mobile station. When the conference server receives the SIP OK, the conference server may transmit a SIP ACK to the second mobile station through the first mobile station.

Upon completion of the conference setup signaling, the second mobile station may receive media streams through the first mobile station. The media streams, for example, may be RTP based. In one example, the media streams may be sent from the conference server. However, media streams may also be sent directly from a mobile station or a media server.

These as well as other aspects, advantages, and alternatives, will become apparent to those of ordinary skill in the art by reading the following detailed description, with reference where appropriate to the accompanying drawings. Further, it should be understood that the foregoing summary, like the other description provided below, is intended to illustrate the invention by way of example only and not by way of limitation.

DETAILED DESCRIPTION

1. Wireless Communication System

Figure 1:
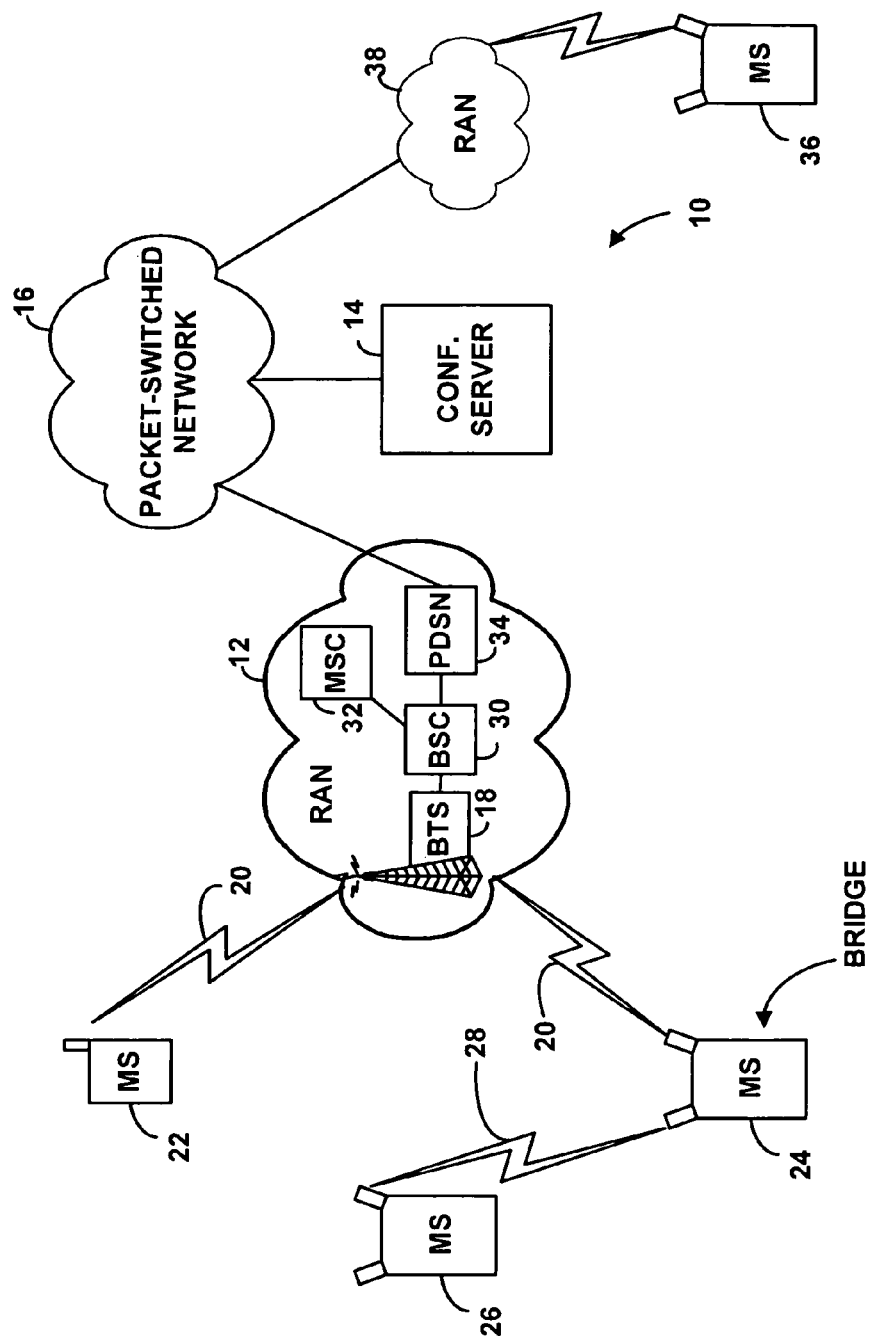
FIG. 1 is a simplified block diagram of a communication network in which examples of the present invention can be implemented.

Referring to the drawings, FIG. 1 is a simplified block diagram of an exemplary wireless communication system 10. It should be understood, however, that this and other arrangements and processes described herein are set forth for purposes of example only, and other arrangements and elements (e.g., machines, interfaces, functions, orders of elements, etc.) can be added or used instead and some elements may be omitted altogether. Further, as in most telecommunications applications, those skilled in the art will appreciate that many of the elements described herein are functional entities that may be implemented as discrete components or in conjunction with other components, in any suitable combination and location, and by hardware, firmware, and/or software (e.g., one or more processors programmed with machine language instructions to carry out the functions described).

The system 10 may be used to establish a PoC based conference call between at least two mobile stations. The system 10 includes a radio access network (RAN) 12, which provides connectivity between one or more mobile stations and one or more transport networks. The system 10 further includes a conference server 14 that is coupled to the RAN 12 via a packet-switched network 16, which could be an Internet Protocol network, for example. As will be described below, the conference server 14 coordinates conference setup signaling between mobile stations and establishes a conference leg with each conference call participant. Generally speaking, a conference leg is a media session that terminates at one end with a mobile station and at another end with the conference server 14. However, it is contemplated that the conference server 14 may be configured to handle conference setup signaling separately from media distribution and replication. It should be understood, therefore, that a conference leg may exist between a mobile station and other entities, such as a media server or a mobile station.

The conference call set up by the system 10 may be half-duplex in nature, where one participant of the conference call has the floor at a time (e.g., by pushing a "talk" button located on a mobile station). However, the system 10 may also be configured to set up a conference call that is full-duplex, allowing each conference call participant to transmit and receive conference call related communications at the same time.

As an example, the conference server 14 may comprise a PTT server for setting up a voice-based conference call. In such an example, a mobile station may use a voice over packet application (VoP) to packetize voice data for transmission over the packet-switched network 16. Such a mobile station may transmit the packetized voice data via an RTP based media stream, although other types of media streams are possible. Therefore, the examples described below are generally related to packet-based communications and the conference server 14 works in conjunction with packet-based elements (i.e., routers, gateways, servers, etc.). However, it is contemplated that the description below, where appropriate, may be applicable to circuit-switched networks and applications.

It should be understood, however, that the conference server 14 is not limited to voice-based communications. Instead, the conference server 14 may be more generally referred to as a push-to-X server, where X refers to a variety of media types. More detail with regard to the conference server 14 will be described with reference to FIG. 3.

To wirelessly exchange packetized data between a mobile station and the packet-switched network 16, the RAN 12 includes a base transceiver station (BTS) 18 (e.g., a Motorola SC4812, SC611, SC614 or SC4850) that radiates to produce a cellular air interface coverage area 20 in which mobile stations can operate. (As used herein, the term "cellular" contemplates WWAN technology such as CDMA, TDMA, AMPS, GSM, or other such technologies now known or later developed.) FIG. 1 depicts the RAN 12 serving three mobile stations (shown as cellular telephones) 22, 24, and 26. In an example, the mobile stations 24 and 26 are multi-mode devices (described with reference to FIG. 2) that include Wi-Fi access point functionality. (As used herein, the term "Wi-Fi" contemplates any WLAN communication technology now known or later developed.) The mobile stations 24 and 26 may, therefore, communicate or exchange data via both Wi-Fi and cellular communication.

In the system 10, the mobile stations 22, 24, and 26 are positioned in the coverage area 20. The mobile station 26 is also positioned within a Wi-Fi coverage area 28 produced by the Wi-Fi access point functionality of the mobile station 24. As will be described below, the mobile station 26 may use the Wi-Fi coverage area 28 to exchange conference setup signaling with the conference server 14. Additionally, the mobile station 26 may also use the Wi-Fi coverage area 28 for exchanging media streams with mobile stations that are participating in a conference call.

Within the RAN 12, the BTS 18 is coupled with a base station controller (BSC) 30 (e.g., a Nortel BSS or a Motorola CBSC), which is then coupled with a mobile switching center (MSC) 32 (e.g., a Lucent 5ESS) and a packet data serving node (PDSN) 34 (e.g., a Nortel Shasta 5000 or a UTStarcom Total Control 1000). The MSC 32 provides mobility management as well as connectivity with a public switched telephone network (not shown). And the PDSN 34 provides connectivity with the packet-switched network 16.

FIG. 1 also shows the packet-switched network 16 coupled to a mobile station 36 via a RAN 38, which may include similar elements to those shown with respect to RAN 12 (e.g., a BSC, a BTS, a PDSN, etc.) With this arrangement, a mobile station can be arranged to participate in a conference call with the mobile station 36 through a communication path comprising the air interface 20, the BTS 18, the BSC 30, the PDSN 34, the packet-switched network 16, and the RAN 38. Further, when appropriate, a communication path may further comprise a Wi-Fi link between mobile stations served by the RAN 12.

Note that many variations on the system of FIG. 1 are possible. For example, although the figure shows only one BTS, one BSC, one MSC, and one PDSN, the system 10 could include multiples of these entities. That is, a PDSN could serve one or more BSCs, each BSC could serve one or more BTSs, and each BTS could radiate to provide one or more coverage areas. Further, the RAN could include a packet control function (PCF) (not shown) between a BSC and PDSN. As another example, the functional components of the RAN 12 could be combined together in various ways. For example, the BTS 14 and the BSC 24 could be combined together. As still another example, one or more of the functional components shown in the figure could be omitted altogether.

And as yet another example, although each mobile station is shown in FIG. 1 as a cellular telephone, the RAN 12 could equally serve other sorts of mobile stations as well, such as wirelessly-equipped personal digital assistants (PDAs), or wirelessly-equipped personal computers, for instance. Further, note that "mobile station" is a term of art that can encompass any wireless communication device, regardless of whether the device is easily movable (e.g. portable) or is located in a fixed position.

When a mobile station powers on or otherwise enters the coverage area of the RAN 12, the mobile station may first register with the RAN 12. To do so, the mobile station may send a registration message over an air interface access channel to the RAN 12, providing the RAN 12 with an identification of the mobile station, such as a mobile identification number (MIN), a network access identifier (NAI), and/or electronic serial number (ESN) and other information. The RAN 12 may then authenticate and authorize the mobile station. Further, the RAN 12 may obtain a copy of the mobile station's service profile from a home location register (not shown) and store the profile in a visitor location register (VLR)(not shown) for later reference.

Once the mobile station is registered, the mobile station may then originate outgoing communications via the RAN 12 and receive incoming communications via the RAN 12. For example, the mobile station may establish a packet data session with the PDSN 34 and acquire an IP address for communication on the packet-switched network 16, using that IP address to exchange packet-data with the mobile station 36. In most instances, a mobile station will retain its IP address even if it moves outside of the coverage area 20.

To engage in packet-data communication, a mobile station would first acquire both a radio link (i.e., a traffic channel) via the air interface 20 and a data link via the PDSN 34. To do this, the mobile station may send an origination message to the RAN 12, including in the origination message a packet-data service option code. Upon receipt of the origination message bearing that service option code, the MSC 32 may then instruct the BSC 30 to process the origination, and the BSC 30 may responsively assign a traffic channel for use by the mobile station and may signal to the PDSN 34 to facilitate setup of packet-data connectivity. The PDSN 34 and the mobile station may then negotiate to establish a data link layer connection, such as a point-to-point protocol (PPP) session for instance, and the PDSN 34 or other network entity may assign an IP address for the mobile station to use on packet-switched network 16. Other mechanisms for acquiring wireless packet data connectivity are also known and can be used instead. For instance, in an evolution data only (EvDO) based RAN, a radio network controller (RNC) may operate in a manner analogous to a BSC.

Once the mobile station acquires packet-data connectivity, the mobile station may then send and receive packet-data via the PDSN 34 and the packet-switched network 16, to communicate with other packet network nodes, such as the mobile station 36. By way of example, assuming the mobile stations that are in a conference call are programmed with SIP client logic and RTP client logic (as described below), the conference server 14 coordinates SIP signaling between the conference call participants and sets up RTP sessions through which the mobile stations may exchange real-time packet-based communications such as voice or video. Other examples are possible as well.

When a mobile station has a radio link and a data link, the mobile station is considered to be in an "active" state. After a certain period of time during which no packet-data flows to or from the mobile station, however, the BSC 30 may release the traffic channel that had been assigned to the mobile station, which would put the mobile station in a "dormant" state. In the dormant state, the mobile station would lack a radio link, but it would still have a data link via the packet-switched network 16. Thus, the mobile station may still seek to send packet-data to other entities on the packet-switched network 16, and other entities on the packet-switched network 16 may still seek to send packet-data to the IP address of the mobile station.

In the dormant state, if the mobile station seeks to send packet-data, the mobile station would first send an origination message to the RAN 12, and the BSC 30 would responsively assign a traffic channel for use by the mobile station via the BTS 18, thereby putting the mobile station in the active state. The mobile station may then send the packet-data over that traffic channel and via the RAN 12 onto the packet-switched network 16.

Similarly, when the mobile station is in the dormant state, if another entity on the packet-switched network 16 seeks to send packet-data to the IP address of the mobile station (e.g., a conference setup message or a media stream) the packet-data would arrive at the PDSN 34 and flow to the BSC 30. Because the mobile station would lack a radio link over which the BSC 34 could send the incoming packet-data, the BSC 34 would then carry out a paging process over an air interface paging channel with the mobile station. Typically, the BTS 18 transmits a page message over the air interface 20 that carries an identifier of the mobile station, such a MIN, so that the mobile station can determine that the page message is for the mobile station. For instance, the BSC 30 may page the mobile station and, if successful, receive a page response and assign a traffic channel over which the mobile station can communicate. Once the radio link is established, the BSC 30 may then transmit the packet-data to the mobile station over that traffic channel.

2. Example Multi-Mode Device

Figure 2:
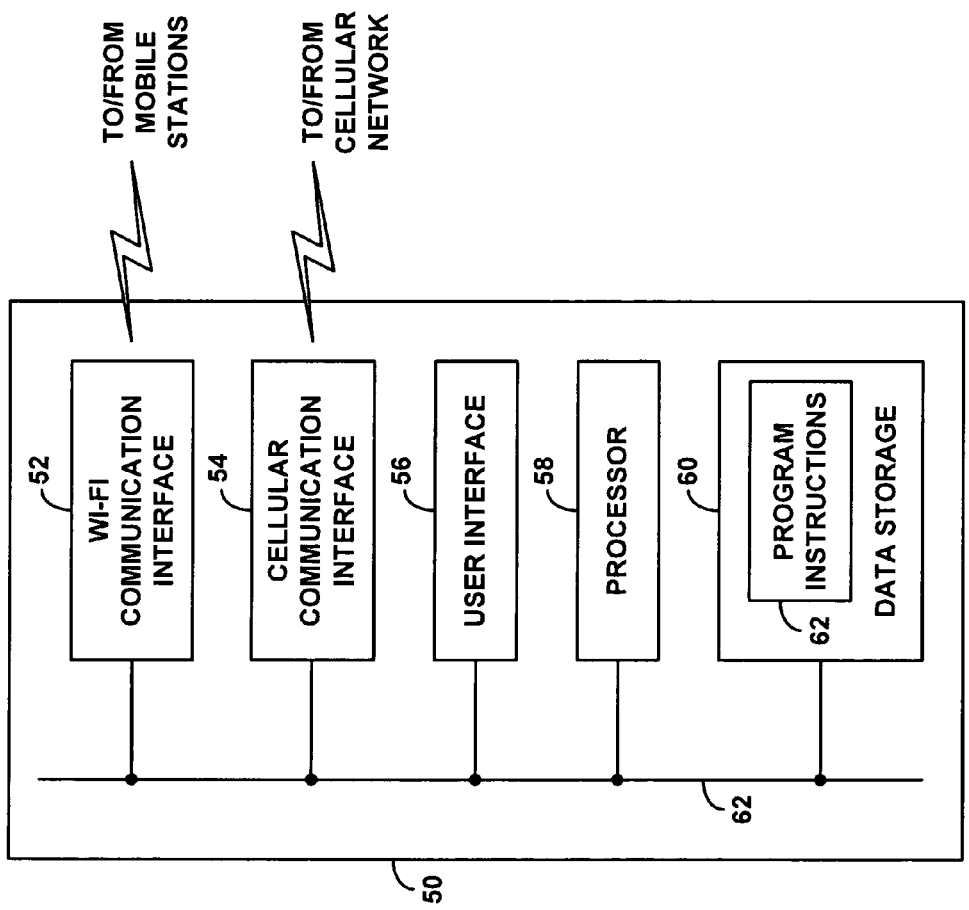
FIG. 2 is a simplified block diagram of a multi-mode device.

FIG. 2 is next a simplified block diagram showing various functional components that a multi-mode device such as either of mobile stations 24 and 26 may include in accordance with the present disclosure. As shown in FIG. 2, a multi-mode device 50 includes a Wi-Fi communication interface 52, a cellular communication interface 54, a user interface 56, a processor 58, and data storage 60, all of which are coupled together by a system bus or other mechanism 62. Although the components of the multi-mode device 50 are shown within one unitary box, it should be understood that the components can instead be distributed among various physically separate entities.

The Wi-Fi communication interface 52 may comprise an 802.11 chipset and antennas adapted to facilitate Wi-Fi air interface communication with other mobile stations. The Wi-Fi communication interface 52 may also include a Wi-Fi based chipset that allows a mobile station to serve as a Wi-Fi access point, for example, in the same manner that portable wireless devices today can be set to function as Wi-Fi access points.

The cellular communication interface 54, similarly, may comprise a cellular chipset and antennas adapted to facilitate communication with a cellular radio access network according to a protocol such as CDMA, TDMA, AMPS, or GSM, for instance. The Wi-Fi communication interface 52 and the cellular communication interface 54 can be integrated in whole or in part, such as in the form of an integrated chipset and/or sharing one or more antennas.

The user interface 56 preferably comprises user output components such as a display screen and audio speaker, and input components such as a keypad, touch-sensitive screen, and microphone. Further, the user interface 56 preferably includes circuitry for converting between analog and digital representations of voice or media, so as to facilitate communication of such media.

The processor 58 preferably comprises one or more general purpose processors and/or special purpose processors. And the data storage 60 preferably includes one or more volatile and/or non-volatile storage components (e.g., magnetic, optical, or organic components) and may be integrated in whole or in part with the processor 58.

As shown, the data storage 60 contains program instructions executable by the processor 58 to carry out various functions described herein, whether as the mobile station 24 or the mobile station 26. For example, the program instructions may be executable by the processor to receive/detect from the RAN 12 a conference set up message carrying a presently contemplated bridged-node indicator or a presently contemplated bridged-leg indicator and to responsively turn on a bridge function. Both the bridged-node and bridged-leg indicators may be newly defined service option codes, for instance, serving as directives that respectively instruct a mobile station to either act as a bridge-node or alternatively use a bridged-node mobile station to exchange conference setup signaling and media streams over the RAN 12.

If the program instructions are to include a bridged-node indicator, the program instructions may be executable by the processor to function as a Wi-Fi access point, associating, for example, an SSID with a call ID of a conference call, broadcasting the SSID via the Wi-Fi interface 52, receiving/detecting an association request from a Wi-Fi station, authenticating and otherwise establishing a Wi-Fi station with the Wi-Fi station.

In another example, if the program instructions are to include a bridge-leg indicator, the program instructions may be executable by the processor to function as a Wi-Fi station by associating an SSID with a call ID of conference call, detecting an SSID broadcast from an access point, sending an association request to the access point, and establishing Wi-Fi association with the access point.

In a further example, the program instructions may define SIP client logic for engaging in IP-based conference setup signaling, such as SIP signaling, and the program instructions may define RTP client logic for facilitating RTP communication.

And as yet another example, the processor 58 may also use the program instructions to direct routing of the SIP signaling and the RTP communication. For example, if the mobile device 50 is acting as the bridge-node mobile device, the program instructions may direct the mobile device 50 to forward conference setup signaling and media streams over the Wi-Fi interface 52 to other mobile stations. Alternatively, if the mobile device 50 is acting as a bridged-leg, the program instructions 62 may direct the mobile device 50 to forward communication through the Wi-Fi interface 52 to the bridged-node mobile station and, using the bridged-node mobile station's traffic channel, on to the conference server 14.

3. Example Conference Server

Figure 3:
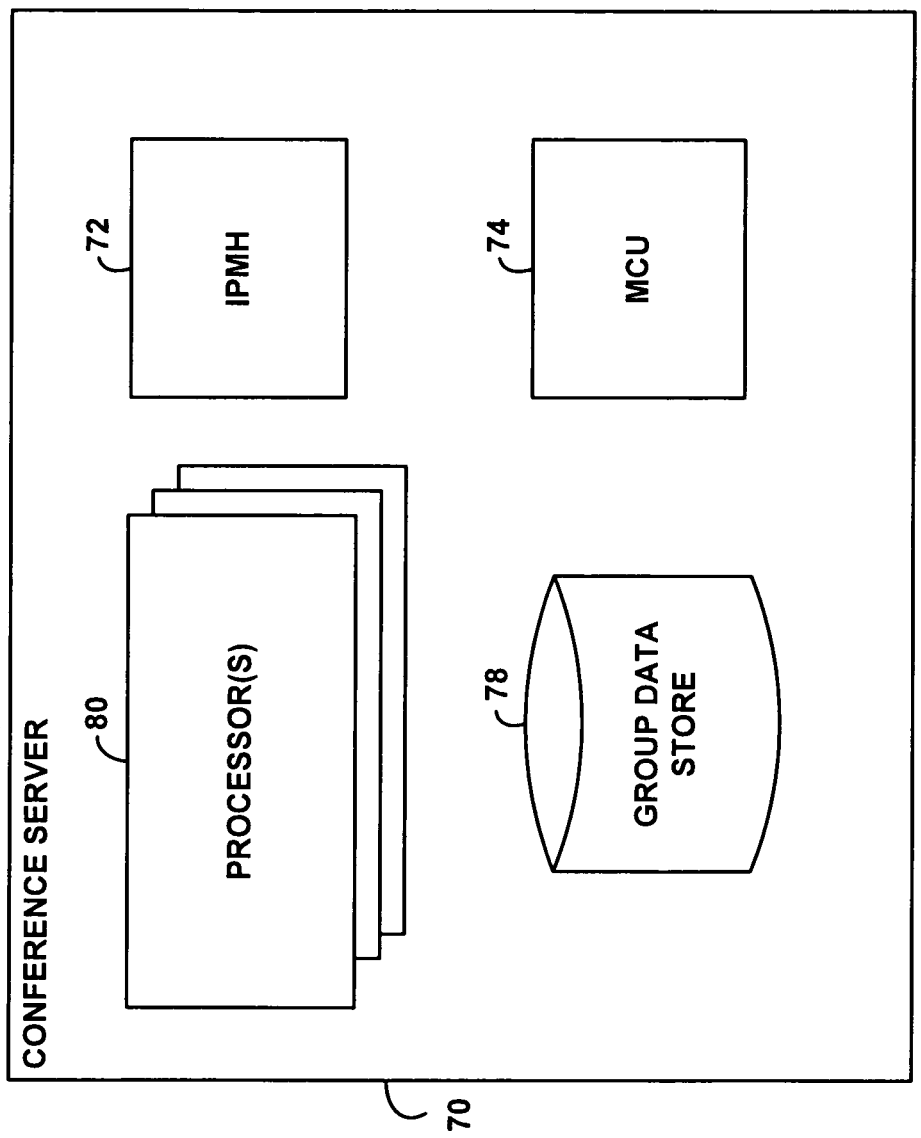
FIG. 3 is a simplified block diagram of a conference server.

FIG. 3 is a simplified block diagram of a conference server 70 that is for coordinating conference setup signaling and the distribution and the replication of media streams (when appropriate). In general, the conference setup messages described below comprise SIP based messages and the media streams may be RTP based. However, the conference server 70 may be configured to manage various other types of setup messages, signaling protocols and/or media streams.

Additionally, although the conference server 70 is shown as a single box in the figure, in practice it could also be a combination of servers, such as LINUX-based computers for example, which can be distributed or co-located. By way of example, the conference server 70 can include a chassis that holds multiple bladed server cards, each programmed to carry out one or more specialized functions. Further, backup servers or backup conference servers altogether may be provided for redundancy.

As shown, the example conference server 70 includes an IP Message Handler (IPMH) 72, a multipoint conference unit (MCU) 74, and group data store 78. The IPMH 72 and the MCU 74 are program functions. For instance the program functions can be written in Perl 5.x or another program or scripting language and can be suitably compiled to be executed by one or more processors 80 of the conference server 70. Further, the IPMH 72 and the MCU 74 functions can be integrated together on a single entity or distributed on one or more separate entities. The log file data store 76 and the group data store 78 are functional data storage components, which may include the program logic of IPMH 72, MCU 74, and/or may be distributed or otherwise situated.

Generally speaking, the IPMH 72 functions to send and receive conference set up messages (e.g., SIP messages comprising a SIP stack) so as to set up and perhaps tear down conference legs with mobile stations, such as the mobile stations 22, 24, 26, and 36. The MCU 74, in turn, may function as an RTP endpoint of the conference server 70 for those conference legs and may be responsible for receiving an incoming media stream, replicating the media stream (when appropriate), and forwarding the media stream(s) to one or more mobile stations. And the group data store 78 functions to hold pre-provisioned group data, correlating particular users (e.g., by NAI or SIP address) or group ID numbers with other group members (e.g., by NAI or SIP address). The conference server 70 may further comprise a user interface (not shown) for entering the pre-provisioned group data (e.g., via a network interface, operator input, etc.).

In normal operation, an originating mobile station initiates a conference call with one or more mobile stations, and the IPMH 72 will engage in SIP signaling with the various mobile stations to set up the conference call. For example, if an originating mobile station initiates a conference call with a predefined group made up of one or more target mobile stations, the originating the mobile station may thus send to the IPMH 72 a SIP INVITE seeking to set up the session, and designating, in a To header or other field of the SIP INVITE, a group-ID associated with the target mobile station(s). The IPMH 72 may then dip into the group data store 78 to correlate that group-ID with a SIP address of each target mobile station.

In accordance with an example, the group IPMH 72 may be configured to operate according to an algorithm that identifies which mobile station (selected from the target mobile stations and the originating mobile station) is to serve as a bridged-node. Execution of the algorithm, for example, may cause the IPMH 72 to insert a bridged-node indicator in a header field or an SDP field of a SIP INVITE that the IPMH 72 sends to the selected bridged-node mobile station. Further, to direct mobile stations that are not selected to act as the bridged-node mobile station, execution of the algorithm may also cause the IMPH 72 to insert a bridged-leg indicator in a SIP INVITE messages that the IMPH 72 transmits to a mobile station that is to act as a bridged-leg.

In one example, the algorithm may randomly select the bridged-node mobile station and the bridge leg mobile station(s) from a list of mobile stations associated with the pre-provisioned group data. However, the algorithm may also receive location based input, such as from a visitor location register (VLR) or a home location register (HLR) associated with the originating mobile station or one or more of the target mobile stations. Accordingly, the algorithm may make a determination of which mobile station is to be the bridged-node mobile station based on the location of a mobile station relative to other conference call participants. In such an example, the algorithm may select a mobile station as the bridged-node based on the mobile station being within Wi-Fi range of other conference call participants.

As a further example, the algorithm may seek to optimize traffic channel usage by selecting a bridged-node mobile station that can service the largest number of bridged-leg mobile stations. Other algorithms are also possible.

After the IPMH 72 determines the bridged-node and the bridged-leg mobile station(s), the IPMH 72 may then engage in SIP signaling with each target mobile station to set up a terminating leg respectively between the MCU 74 and each target mobile station, and the IPMH 72 may engage in continued SIP signaling with the originating mobile station to set up an originating leg between the originating station and the MCU 74. A SIP based call flow of such an exchange will be described in more detail with reference to FIG. 4. After the conference setup signaling is completed, the MCU 74 may then bridge the conference legs with the target mobile station(s) and the originating mobile station together, so as to allow the conference call participants to communicate with each other.

4. Bridged Conference Call Setup

Returning now to FIG. 1, as noted above, a conference call setup process may begin when the conference server 14 receives a conference setup request, seeking to set up a conference with the mobile stations 24 and 26. The call setup request could be a request from any of the mobile stations 22, 24, or 26 (e.g., a request to conference another mobile station served by the same RAN), or the call setup request could be a request that arrives via a transport network such as the packet-switched network 16, where the request is sent from the mobile station 36, for example. As noted above, a conference set up request received from the packet-switched network 16 may arrive at the PDSN 34 in the form of a packet-based call setup request message such as a SIP INVITE for instance, identifying the mobile stations 24 and 26, or a group of which the mobile stations 24 and 26 are members. Other sorts of conference setup requests are possible as well.

When the conference server 14 receives the call setup request, the conference server 14 generates a conference setup request that includes the presently contemplated bridged-node indicator, wherein, by way of example, the mobile station 24 is selected to act as a bridged-node. At a point before, after, or simultaneous to the generation or transmission of the bridged-node indicator, the conference server 14 also generates another conference setup request that includes the presently contemplated bridged-leg indicator, indicating, in this example that the mobile station 26 is to act as a bridged-leg. As noted above, the selection of which mobile station is to act as the bridged-node and bridged-leg mobile stations may be carried out by way of an algorithm.

Once the bridged-node mobile station and bridge leg mobile station(s) are determined, the conference server 14 accordingly sends the conference setup requests (e.g. SIP INVITEs), either simultaneously or separately to the appropriate mobile stations over a traffic channel associated with each of the mobile stations 24 and 26. In additional or alternative examples, the conference server 14 may send multiple bridged-node-indicating conference setup requests. In such examples, two or more mobile stations may act bridged-nodes, perhaps for the purpose of optimizing the consolidation of traffic channels.

When the RAN 12 receives the conference setup requests, the RAN 12 may verify that both of the mobile stations 24 and 26 are in an active state and thus each have an assigned traffic channel. If, however, either of the mobile stations 24 and 26 are in a dormant state, the RAN 12 may attempt to awaken either of the mobile stations 24 and 26. When the mobile station 24 is active, the RAN 12 may forward the conference setup message with the bridged-node indicator to the mobile station 24 via a traffic channel associated with the mobile station 24. Similarly, when the mobile station 26 is active, the RAN 12 may use a traffic channel associated with the mobile station 26 to forward the conference setup message with the bridged-leg indicator to the mobile station 26.

When the mobile station 24 receives the conference setup message with the bridged-node indicator, the mobile station 24 may then transmit an OK (e.g., a SIP OK) message to the conference server 14 by way of the RAN 12. The OK message indicates to the conference server 14 that the mobile station 24 will participate in the conference according to agreed upon media stream parameters contained with the conference setup message that includes the bridged-node indicator. Preferably, the OK message will also verify whether or not the mobile station 24 has agreed to act as the bridged-node. If, for example, the bridged-node mobile station 24 does not agree to act as the bridged-node the mobile station may use the OK message to indicate that the mobile station 24 does not agree to act as a bridged-node. In such an example, the conference server 14 may send an acknowledge message (e.g. a SIP ACK) to the mobile station 24, acknowledging that the mobile station 14 will act as a "normal" conference leg. Furthermore, if the mobile station 24 does not agree to act as the bridged-node, the conference server 14 may attempt to use another mobile station served by the RAN 12 as a bridged-node.

Assuming that the mobile station 24 has agreed to act as a bridged-node, the mobile station 24 will turn on its Wi-Fi access point functionality and may begin broadcasting a pre-defined SSID for detection by the mobile station 26. As described above, the broadcasted SSID preferably includes a call-ID associated with the conference call. However, other values of SSID are possible.

When the mobile station 26 receives the conference setup message with the bridged-leg indicator, the mobile station 26 may, in response, begin to scan for the SSID that is broadcast by the mobile station 24. Alternatively, the mobile station may scan for an SSID that is broadcast by other mobile stations (e.g., in case the mobile station 24 did not agree to act as the bridged-node and another mobile station is acting as the bridged-node).

If the mobile station 26 detects the SSID and agrees to use the mobile station 24 as the bridged-node mobile station, the mobile station 26 may send an association request to the mobile station 24 via the Wi-Fi interface 52. Once the Wi-Fi link is established, the mobile station 26 may then send an OK message to the conference server 14 via a communication path comprising a Wi-Fi link between the mobile station 24 and 26 and a traffic channel between the mobile station 24 and the RAN 12. When the conference server 14 receives the SIP OK transmitted from the mobile station 26 over the communication path, the conference server 14 will transmit future conference setup signaling and media streams through the communication path. After a certain period of time during which no packet-data flows to or from the mobile station 26 over the traffic channel associated with the mobile station 26 the RAN 12 (via the BSC 30) may release the traffic channel that had been assigned to the mobile station 26, thus consolidating conference signaling and media streams associated with both of the mobile stations 24 and 26 to a single traffic channel. Such consolidation may then free up the traffic channel previously assigned to the mobile station 26 for other mobile stations to use.

If, however, the mobile station 26 does not agree to act as a bridged-leg, or cannot detect the SSID broadcast by the mobile station 24, the mobile station 26 may send an OK message to the RAN 12 via the traffic channel associated with the mobile station 26. Accordingly, the conference server 14 may then setup a conference with the mobile stations 24 and 26 in a "normal" manner (i.e., without using the mobile station 24 as a bridged node to the mobile station 26). Instead, the conference server 14 may finish conference call set up by establishing a "normal" conference call leg with each of the mobile stations 24 and 26, where each of the conference legs comprises separate traffic channels.

5. Example Call Setup Process

Figure 4:
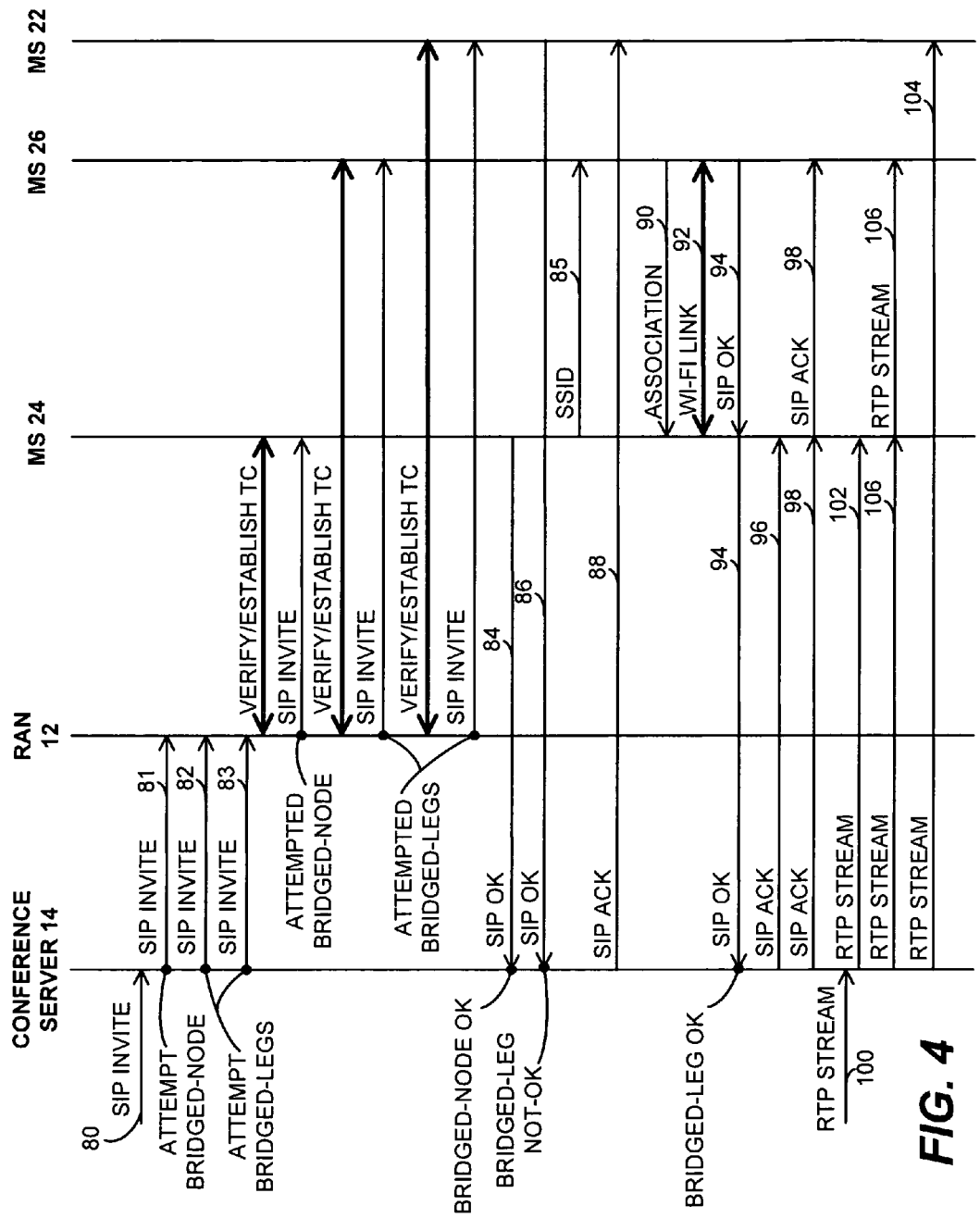
FIG. 4 is a message flow diagram depicting bridged conference call setup.

FIG. 4 is an exemplary call flow diagram illustrating an example of how the invention may work in practice to extend a conference call to the mobile station 26 via the mobile station 24. FIG. 4 also shows conference leg setup with the mobile station 22 (see FIG. 1). However, the conference call may include more or fewer mobile station participants. For example, the conference call may include the mobile station 36 and not the mobile station 22 or neither of the mobile stations 22 and 36.

Referring to FIG. 4, at step 80, the conference server 14 receives a SIP INVITE indicating that a conference call is to be set up with the mobile stations 22, 24, and 26. The SIP INVITE, for example, may be sent from any of the mobile stations 22, 24, 26, and 36 and may contain a group-ID identifying the conference call participants as the mobile stations 22, 24, and 26. In response to the SIP INVITE, the conference server 14 may then programmatically select the mobile station 24 from pre-provisioned group data associated with the group-ID to attempt to use the mobile station 24 as a bridged-node for extending the conference call to other mobile stations. The conference server 14 also selects the mobile stations 22 and 26 to attempt to use the bridged-legs.

Either simultaneously or separately, at steps 81-83, the conference server sends a SIP INVITE to each of the mobile stations 22, 24, 26 via the RAN 12. The SIP INVITE destined to the mobile station 24 may include the presently contemplated bridged-node indicator, which directs the mobile station 24 to begin functioning as a bridged node. On the other hand, the SIP INVITE destined to each of the mobile stations 22 and 26 may include the presently contemplated bridged-leg indicator.

The RAN 12, responsive to the SIP INVITE messages sent from the conference server 14, verifies or establishes a traffic channel with each of the mobile stations 22, 24, 26. Upon establishment or verification of a traffic channel, the RAN 12 forwards the SIP INVITE messages to the appropriate mobile station over a traffic channel associated with each of the mobile stations 22, 24, and 26.

At step 84, the mobile station 24 replies to the conference server 14 with a SIP OK. The mobile station 24 acknowledges that the mobile station 24 will act as a bridged-node and begins functioning as a Wi-Fi access point to facilitate establishing a Wi-Fi link with the mobile stations 22 and 26. Thus, at step 85, the mobile station 24 broadcasts the predefined SSID.

During the conference setup signaling, for any one of a variety of reasons, the mobile station 22 determines not to use a Wi-Fi link with the mobile station 24. For example, the mobile station 22 may not be able to detect the SSID that is broadcast by the mobile station 24. Consequently, at step 86, the mobile station 22 uses the traffic channel associated with the mobile station 22 to transmit over the RAN 12 a SIP OK to the conference server 14. The conference server 14 receives the SIP OK, and at step 88 acknowledges via a SIP ACK message that the traffic channel associated with the mobile station 22 will be used for transmitting future conference setup signaling and media streams.

The mobile station 26, however, agrees to use a Wi-Fi link with the mobile station 26. Accordingly, at step 90, the mobile station 26 engages in an association process with mobile station 24. As a result, a Wi-Fi link 92 is established between the mobile station 24 and the mobile station 26. At step 94, the mobile station 26 transmits a SIP OK to the mobile station over the Wi-Fi link 92 and over the traffic channel associated with the mobile station 24 to the conference server 14.

At step 96, the conference server sends a SIP ACK to the mobile station 24 acknowledging that the mobile station will act as a bridged-node. At step 98, the conference server 14 also sends a SIP ACK to the mobile station 26 via the traffic channel associated with mobile station 24 and the Wi-Fi link 92, acknowledging that future media streams and perhaps conference signaling (e.g., SIP teardowns messages) will be sent through the bridged-node.

Once the conference setup signaling is completed, at step 100, the conference server 14 may receive an RTP bases media stream, replicate the media stream, and distribute the media stream to each of the mobile stations 22, 24, and 26. At steps 102 and 104, the conference server 14 respectively transmits a media stream to each of the mobile stations 24 and 22 via an associated traffic channel. At step 106, the conference server 14 uses the air traffic channel associated with the mobile station 24 and the Wi-Fi link 92 to transmit a media stream to the mobile station 26. Note that the above described call flow is exemplary, the order of the messages and signaling may vary, and other types of messages and/or signaling are possible.

6. Conclusion

An exemplary embodiment of the present invention has been described above. Those skilled in the art will understand, however, that changes and modifications may be made to this embodiment without departing from the true scope and spirit of the present invention, which is defined by the claims.

For example, although the foregoing description focuses on bridging a cellular wireless link to a WLAN link, including CDMA packet-data link for the cellular link and 802.11 for the WLAN link, the invention can be extended to include bridging a variety of wireless networks. In addition a variety of different types of intermediary, bridging devices may be used. Such devices include cell phones, wireless handheld devices, laptops, etc.

Further, although the foregoing discusses setup of a conference call destined to a mobile station via a bridged-node mobile station, the invention could extend as well to facilitate setup of a conference call from a mobile station via a bridged-node mobile station. Still further, it should of course be understood that the term "call" as used herein generally refers to any sort of communication session.

Other examples are possible as well.

We claim:

1. A method comprising:
   receiving into a conference server a request to set up a conference with at least a first mobile station and a second mobile station; and
   responsive to the request:
   (a) the conference server setting up a first conference leg with the first mobile station; and
   (b) the conference server setting up a second conference leg with the second mobile station, wherein at least a portion of conference setup signaling between the conference server and the second mobile station for setting up the second conference leg passes through the first mobile station.

2. The method of claim 1, wherein the first conference leg includes a first wireless link between a radio access network (RAN) and the first mobile station, and wherein the second conference leg includes the first wireless link and a second wireless link between the first mobile station and the second mobile station.

3. The method of claim 2, wherein the first wireless link comprises a cellular wireless link, and wherein the second wireless link comprises a wireless local area network (WLAN) link.

4. The method of claim 3, wherein the first wireless link comprises a CDMA packet-data link, and wherein the second wireless link comprises an 802.11 link.

5. The method of claim 2, wherein setting up the portion of the second conference leg further comprises:
   directing the first mobile station to act as a bridge in which the first mobile station bridges the first wireless link with the second wireless link; and
   directing the second mobile station to use the first mobile station as the bridge; and
   responsive to the directive to use the first mobile station as the bridge, the second mobile station transmitting a first conference setup message to the conference server through a communication path comprising the first wireless link and the second wireless link.

6. The method of claim 5, wherein directing the first mobile station comprises:
   the conference server transmitting a second conference setup message to the first mobile station, wherein the second conference message includes a bridged-node indicator for directing the first mobile station to act as a bridge; and
   the conference server transmitting a third conference setup message to the second mobile station, wherein the third conference message includes a bridged-leg indicator for directing the second mobile station to use the first mobile station as the bridge.

7. The method of claim 5, wherein the second and third conference setup messages each comprises a session initiation protocol (SIP) INVITE message.

8. The method of claim 5, further comprising responsive to being directed to act as the bridge, the first mobile station broadcasting a service set identifier (SSID) for receipt by the second mobile station.

9. The method as in claim 8, wherein the SSID comprises a call-ID associated with the conference.

10. The method of claim 8, further comprising:
    responsive to being directed to use the first mobile station as a bridge, the second mobile station scanning for the SSID; and
    the second mobile station sending an association request to the first mobile station after discovery of the SSID.

11. The method of claim 10, further comprising:
    the first mobile station receiving the association request; and
    the conference server transmitting a second conference setup messages through the communication path to the conference server.

12. The method of claim 11, wherein the second conference message comprises a session initiation protocol (SIP) OK message.

13. The method of claim 12, further comprising the conference server using the communication path to transmit a SIP ACK message to the second mobile station.

14. The method of claim 11, further comprising the second mobile station receiving a media stream through the communication path.

15. The method of claim 14, wherein the media stream is according to the real time transport protocol (RTP).

16. The method of claim 14, wherein the conference server transmits the media stream to the second mobile station through the communication path.

17. The method of claim 1, wherein the conference server is a push-to-talk server (PTT).

18. A system comprising:
- a conference server operable to set up a conference between two or more mobile stations;
- a first mobile station operable to be served by the conference server;
- a second mobile station operable to be served by the conference server; and
- wherein, when the conference server receives a request to set up a conference with the first and second mobile stations, the conference server sets up a first conference leg with the first mobile station and a second conference leg with the second mobile station, and wherein at least a portion of conference setup signaling between the conference server and the second mobile station for setting up the second conference leg passes through the first mobile station.

19. The system of claim 18, further comprising a radio access network (RAN), wherein the first conference leg includes a first wireless link between the RAN and the first mobile station, and wherein the second conference leg includes the first wireless link and a second wireless link between the first mobile station and the second mobile station.

20. The system of claim 19, wherein when the conference server receives the request to set up a conference with the first and second mobile station, the conference server sets up the portion of the second conference leg by a process comprising:
- directing the first mobile station to enter a bridged-conference mode in which the first mobile station bridges the first wireless link with the second wireless link; and
- directing the second mobile station to use the first mobile station as a bridge to the conference server; and
- responsive to the directive to use the first mobile station as a bridge, the second mobile station transmitting a conference setup message through a communication path comprising the first wireless link and the second wireless link.

* * * * *